US012017238B2

(12) United States Patent
Zhou

(10) Patent No.: US 12,017,238 B2
(45) Date of Patent: Jun. 25, 2024

(54) ALL-PLASTIC SPRAY DEVICE

(71) Applicant: Jie Zhou, Yuyao (CN)

(72) Inventor: Jie Zhou, Yuyao (CN)

(73) Assignee: Jie Zhou, Yuyao (CN)

( * ) Notice: Subject to any disclaimer, the term of this patent is extended or adjusted under 35 U.S.C. 154(b) by 467 days.

(21) Appl. No.: 17/486,882

(22) Filed: Sep. 27, 2021

(65) Prior Publication Data

US 2023/0034404 A1 Feb. 2, 2023

(30) Foreign Application Priority Data

Jul. 29, 2021 (CN) ........................ 202110865629.2

(51) Int. Cl.
*B05B 11/00* (2023.01)
*B05B 11/10* (2023.01)

(52) U.S. Cl.
CPC ....... *B05B 11/1077* (2023.01); *B05B 11/1011* (2023.01)

(58) Field of Classification Search
CPC ............. B05B 11/3077; B05B 11/1047; B05B 11/3011; B05B 11/1012; B05B 11/1014; B05B 11/1069; B05B 11/1057
See application file for complete search history.

(56) References Cited

U.S. PATENT DOCUMENTS 5,297,701 A * 3/1994 Steijns ................ B05B 11/0029 222/153.07
2012/0032004 A1* 2/2012 Dejong ............... B05B 11/1047 239/526
2022/0314251 A1* 10/2022 Arminak ............... B05B 11/104
2023/0226567 A1* 7/2023 Liang .................. B05B 11/1011 222/383.1

* cited by examiner

*Primary Examiner* — Vishal Pancholi
*Assistant Examiner* — Robert K Nichols, II
(74) *Attorney, Agent, or Firm* — Nitin Kaushik

(57) ABSTRACT

The invention discloses an all-plastic spray device, comprising a handle, an environmentally friendly cross-arm plastic spring, a positioning seat, a nozzle mechanism, a hexagonal plug, a piston mechanism, an environmentally friendly plastic upper spring, an environmentally friendly plastic lower spring, a plastic ball, and a pump body. The invention adopts the design of two-stage elastic element. Both the environmentally friendly plastic upper spring and the environmentally friendly plastic lower spring are made of plastic materials, which can well replace the metal spring. The two-stage elastic element also has a significant improvement in the pressing feel. In addition to being suitable for conventional liquid use, it is also very suitable for the use of solutions that are prone to corrosion with metal parts. The invention greatly facilitates people's daily use and maintains life, health and safety in people's daily use.

8 Claims, 4 Drawing Sheets

ALL-PLASTIC SPRAY DEVICE

BACKGROUND OF THE INVENTION

1. Field of the Invention

The invention relates to an all-plastic spray device.

2. Description of the Related Art

As a simple and effective solution type liquid output device, micro sprayer is widely used in medical, agricultural, industrial and other daily chemical packaging fields such as hand sanitizer, detergent, shampoos, cosmetics, disinfectants, animal care products, leather polishing, personal care products, furniture polishing products and other fields, which brings people a lot of convenience and quickness. Its working principle is to drive the piston in the pump to move up and down through the reciprocating movement of the head, so that the atmospheric pressure in the pump body is reduced, and the liquid enters the pump body; press the handle down to increase the atmospheric pressure in the pump body, so that the liquid in the bottle is ejected. The sprayer of the prior art relies on a spring located inside the pump body, and the spring is made of metal. When in use, the solution in the bottle will accumulate in the spring position for a long time. Due to the activity of the metal material itself, long-term soaking will cause corrosion. At the same time, the heavy metal content in the composition of the metal spring may exceed the standard. After the metal spring is corroded, it is very easy to cause pollution to the whole package contents, thereby causing harm to the human body. Therefore, the applicant intends to invent an all-plastic spray device that replaces the metal spring with a special environmentally friendly plastic, so that the patented product has a stable structure, reasonable design, good atomization effect, energy saving and environmental protection, long service life, non-toxic and harmless, convenient for overall recycling, and no need to disassemble and classify, which greatly facilitates people's daily use and maintains life, health and safety in people's daily use.

SUMMARY OF THE INVENTION

(1) Technical Problems to be Solved

The research and development purpose of the patented product of the invention is to overcome the above shortcomings, and aims to provide an all-plastic spray device that is safe, non-toxic and harmless, energy-saving and environmentally friendly, convenient for overall recycling, and no need to disassemble and classify.

(2) Technical Solutions

In order achieve the above purpose, the invention provides an all-plastic spray device, comprising a handle, an environmentally friendly cross-arm plastic spring, a positioning seat, a nozzle mechanism, a hexagonal plug, a piston mechanism, an environmentally friendly plastic upper spring, an environmentally friendly plastic lower spring, a plastic ball, and a pump body; wherein:

a connecting rod part extends from one side of the positioning seat; the inner side of the connecting rod part is provided with a guiding groove; the side wall of the guiding groove is provided with a convex part; a guiding shaft is provided at both ends of the connecting rod part; the lower end of the cross-arm plastic spring is inserted into the guiding groove, and the cross-arm plastic spring can be pressed along the end of the convex part; the cross arm of the cross-arm plastic spring abuts against the inner side of the handle; the guiding shaft is rotatably connected to the handle;

the lower end of the nozzle mechanism is provided with a spray boom; a slider is provided at both sides of the spray boom; the upper end of the slider is also provided with an arc-shaped rotating part; an arc-shaped groove is provided on the handle at a position corresponding to the arc-shaped rotating part;

the upper end of the piston mechanism is connected to the spray boom, and the lower end thereof is connected to a piston seat; the environment friendly plastic upper spring is sleeved on the upper end of the piston mechanism; the hexagonal plug is sleeved outside the environment friendly plastic upper spring; the upper end of the environmentally friendly plastic lower spring is connected to the lower end of the piston seat; the hexagonal plug, the piston mechanism, the environmentally friendly plastic upper spring, and the environmentally friendly plastic lower spring are all arranged in the cavity of the pump body; the plastic ball is located between the environmentally friendly plastic lower spring and the pump body.

Preferably, a switch is provided between the spray boom and the positioning seat; the inner side of the switch is symmetrically provided with sliding grooves matched with the sliders; a toggle lever is provided on one side of the switch.

Preferably, the rear part of the handle is provided with shaft holes; the lower end of the shaft hole is provided with a first inclined surface; the upper end of the guiding shaft is provided with a second inclined surface; in assembling, the handle passes through the first inclined surface and the second inclined surface, and the guiding shaft is pressed into the shaft hole.

Preferably, the environmentally friendly plastic upper spring is provided with elastic ribs; the elastic ribs are axially inclined and arranged on the outer circumference of the environmentally friendly plastic upper spring.

Preferably, at least two limiting ribs are evenly arranged on the outer circumference of the switch; the middle of the convex part is provided with a gap; the limiting ribs and the gap are matched and connected.

Preferably, the environmentally friendly plastic lower spring has a ring shape at the upper end, a hollow wave shape at the middle part, and a cylindrical part with a notch at the lower end; the environmentally friendly plastic lower spring is integrally formed.

Preferably, the cylindrical part of the environmentally friendly plastic lower spring abuts against the inner end surface of the pump body.

Preferably, the lower end of the pump body is provided with a suction pipe.

Advantageous Effects

Compared with the prior art, the technical solutions of the invention have the following advantages: the invention adopts the design of two-stage elastic element. Both the environmentally friendly plastic upper spring and the environmentally friendly plastic lower spring are made of plastic materials, which can well replace the metal spring. The two-stage elastic element also has a significant improvement in the pressing feel. In addition to being suitable for conventional liquid use, it is also very suitable for the use of solutions that are prone to corrosion with metal parts. At present, a green, environmentally friendly and low-carbon lifestyle has become the current mainstream. Most sprayers appearing on the market are made of unenvironmentally friendly materials. In the production process of sprayers, the materials used are not environmentally friendly, and a large amount of pollutants and wastewater flow out; pollutants and waste water do not meet the current national regulations, and the difficult-to-degrade pollutants and waste water can cause personal injury, and once caused, it is irreversible, at the same time leads to a serious decline in the service life of the product itself. Therefore, the existing technology has defects, and there is an urgent need in the market for an all-plastic environmentally friendly MINI hand-held micro sprayer to replace the existing product. At the same time, all parts of the patent of the invention are made of environmentally friendly recyclable plastic materials, without any metal materials, which is convenient for overall recycling and does not need to be disassembled and sorted.

DESCRIPTION OF REFERENCE SIGNS

1 refers to the handle; 2 refers to the environmentally friendly cross-arm plastic spring; 3 refers to the positioning seat; 4 refers to the nozzle mechanism; 5 refers to the hexagonal plug; 6 refers to the environmentally friendly plastic upper spring; 7 refers to the piston mechanism; 8 refers to the environmentally friendly plastic lower spring; 9 refers to the plastic ball; 10 refers to the pump body; 11 refers to the piston seat; 12 refers to the thread ring; 13 refers to the suction pipe; 14 refers to the switch; 101 refers to the shaft hole; 102 refers to the arc-shaped groove; 103 refers to the first inclined surface; 31 refers to the connecting rod; 32 refers to the guiding groove; 33 refers to the guiding shaft; 34 refers to the convex part; 35 refers to the gap; 36 refers to the second inclined surface; 41 refers to the spray boom; 42 refers to the slider; 43 refers to the arc-shaped rotating part; 141 refers to the sliding groove; 142 refers to the toggle lever; 143 refers to the limiting rib; 61 refers to the elastic rib; 81 refers to the cylindrical part.

DETAILED DESCRIPTION OF THE PREFERRED EMBODIMENTS

The specific implementation of the patent of the invention will be further described in detail hereinafter with reference to the drawings and embodiments. The following embodiments are used to illustrate the patent of the invention, but are not used to limit the scope of the patent of the invention.

Figure 1:
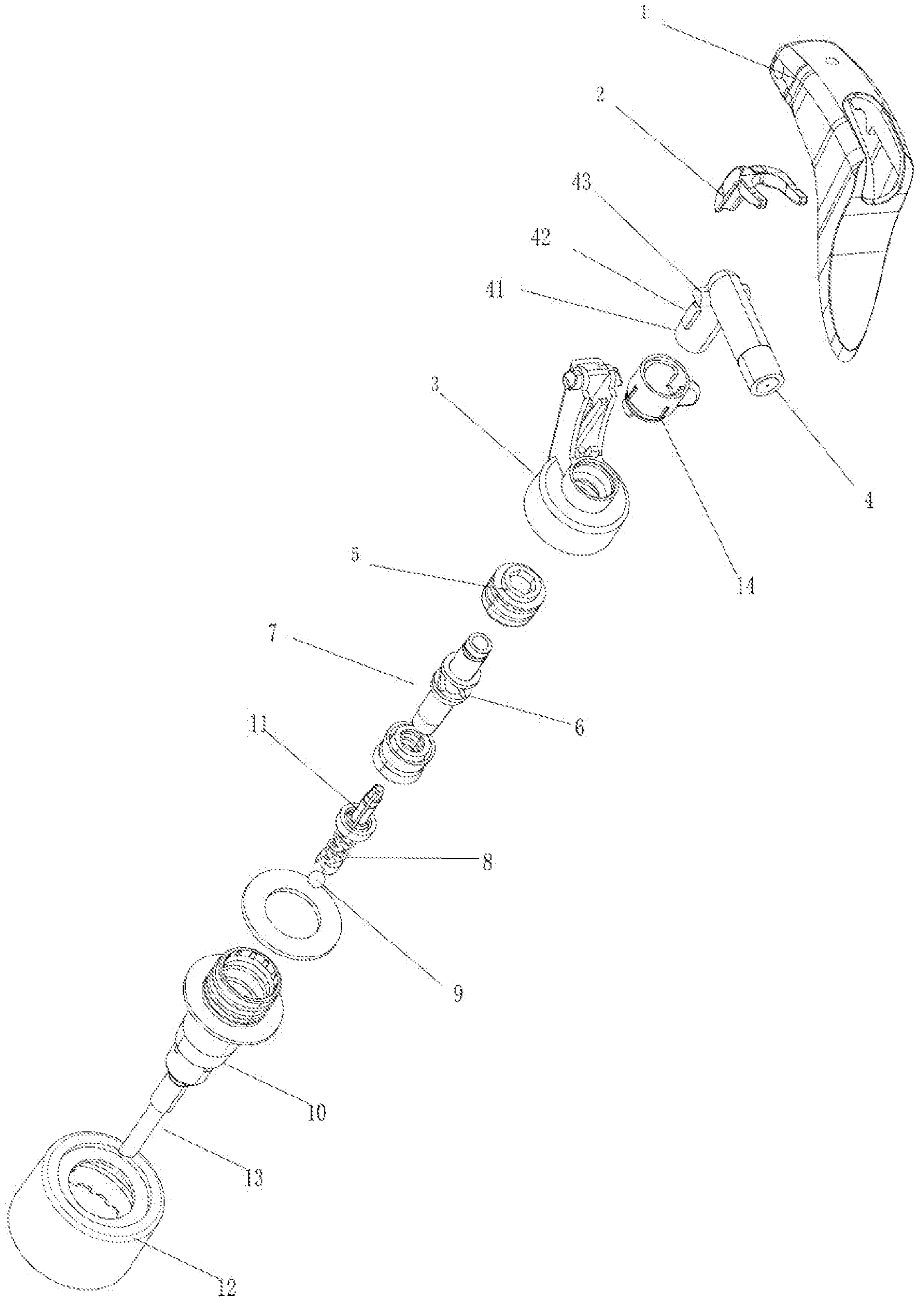
FIG. 1 is an exploded view of the all-plastic spray device of the invention.
Figure 2:
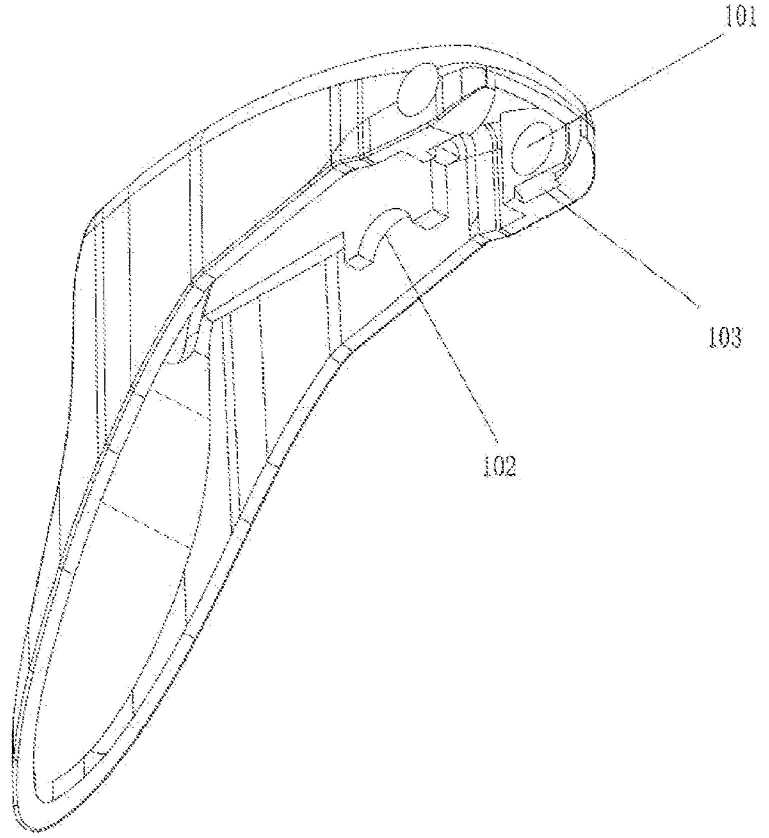
FIG. 2 is a schematic diagram of the structure of the handle of the invention.
Figure 3:
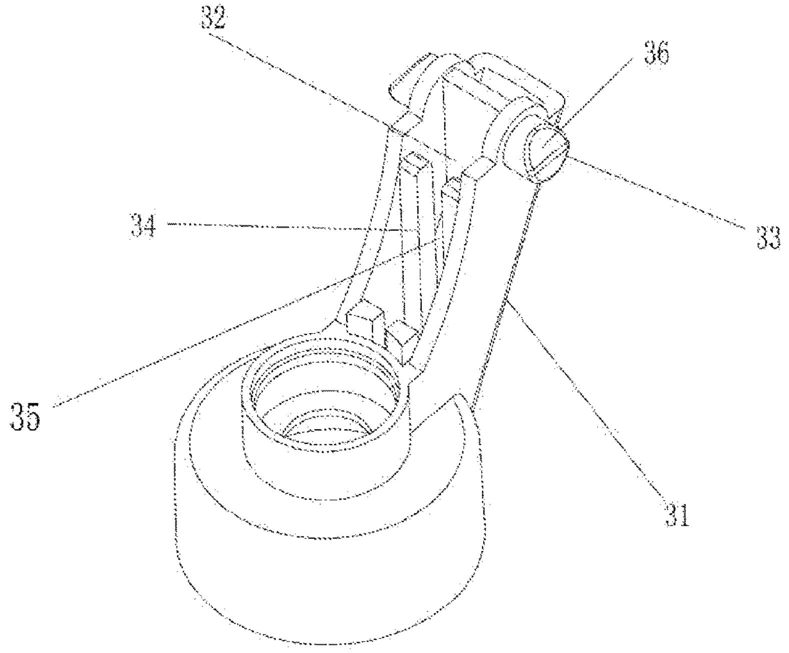
FIG. 3 is a schematic diagram of the structure of the positioning seat of the invention.
Figure 4:
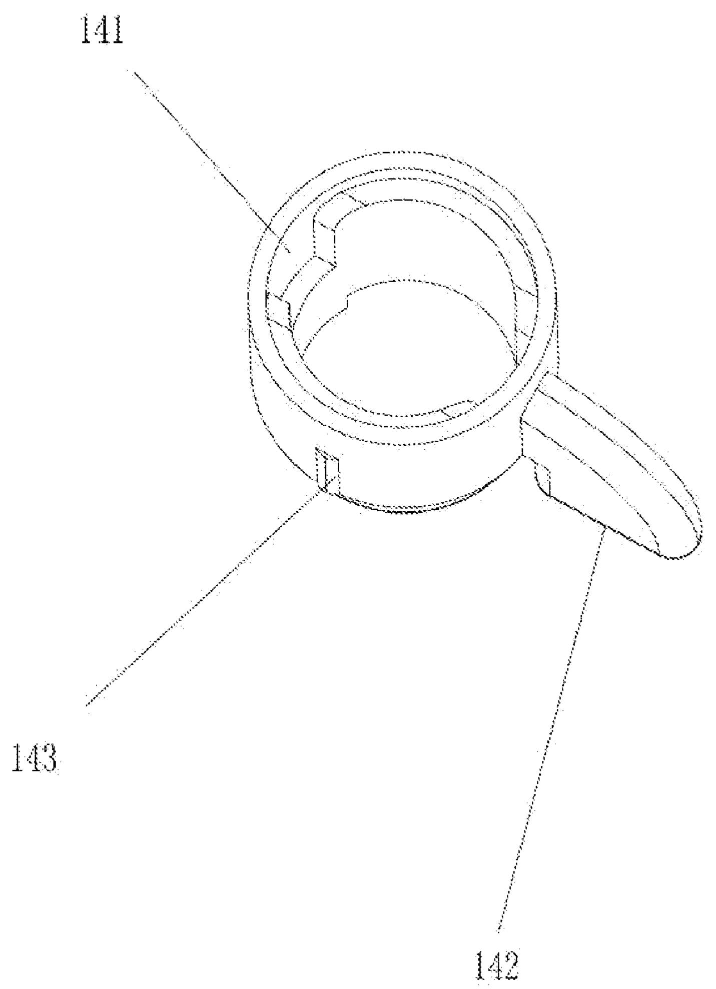
FIG. 4 is a schematic diagram of the structure of the switch of the invention.
Figure 5:
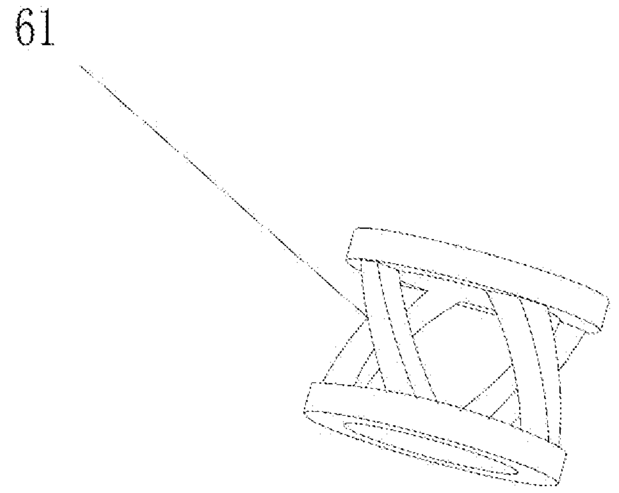
FIG. 5 is a schematic diagram of the structure of the environmentally friendly plastic upper spring of the invention.
Figure 6:
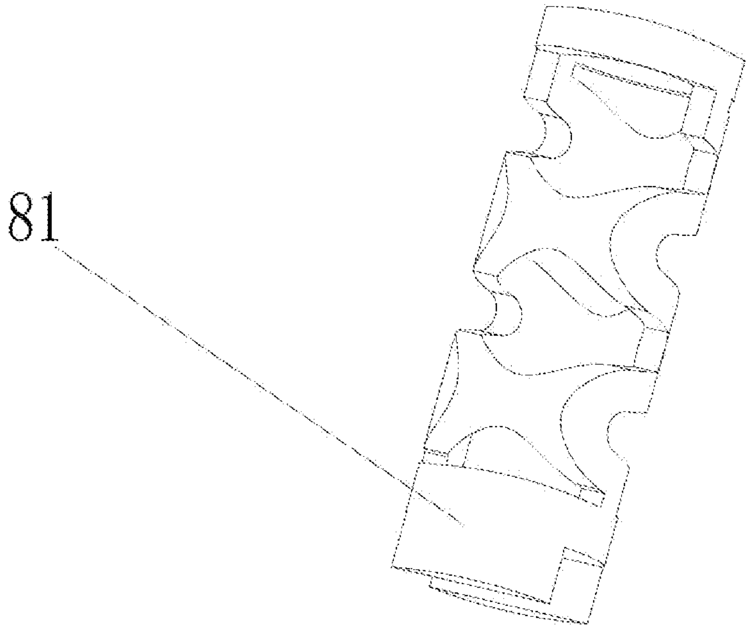
FIG. 6 is a schematic diagram of the structure of the environmentally friendly plastic lower spring of the invention.
Figure 7:
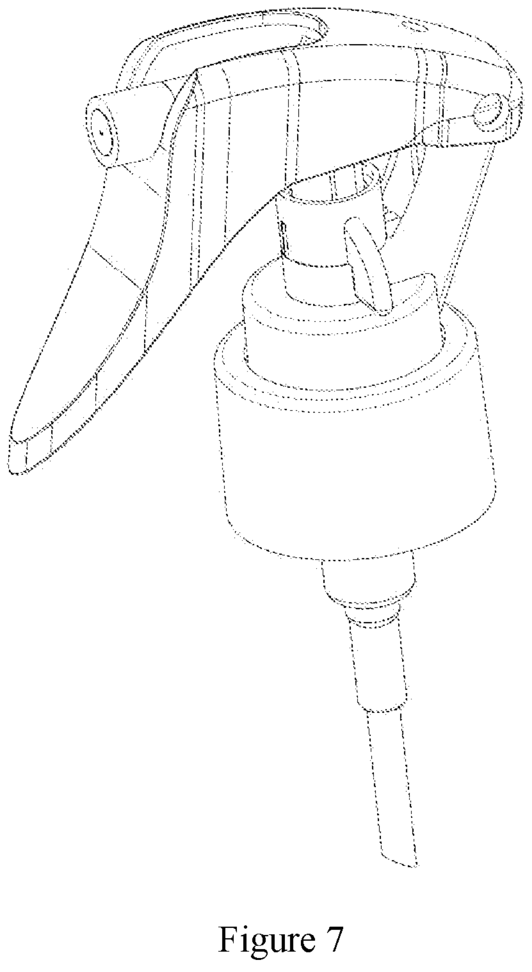
FIG. 7 is a schematic diagram of the structure of the invention after assembly.

As shown in FIG. 1-FIG. 7, an all-plastic spray device of the invention, comprises a handle 1, an environmentally friendly cross-arm plastic spring 2, a positioning seat 3, a nozzle mechanism 4, a hexagonal plug 5, a piston mechanism 7, an environmentally friendly plastic upper spring 6, an environmentally friendly plastic lower spring 8, a plastic ball 9, and a pump body 10; wherein:

a connecting rod part extends from one side of the positioning seat 3; the inner side of the connecting rod part is provided with a guiding groove 32; the side wall of the guiding groove 32 is provided with a convex part 34; a guiding shaft 33 is provided at both ends of the connecting rod part; the lower end of the cross-arm plastic spring is inserted into the guiding groove 32, and the cross-arm plastic spring can be pressed along the end of the convex part 34; the cross arm of the cross-arm plastic spring abuts against the inner side of the handle 1; the guiding shaft 33 is rotatably connected to the handle 1; the guiding shaft 33 exists as a rotating shaft;

the lower end of the nozzle mechanism 4 is provided with a spray boom 41; a slider 42 is provided at both sides of the spray boom 41; the upper end of the slider 42 is also provided with an arc-shaped rotating part 43; an arc-shaped groove 102 is provided on the handle 1 at a position corresponding to the arc-shaped rotating part 43; with this design, the handle 1 can be rotated along the arc-shaped groove 102, so that the nozzle mechanism 4 is moved down and the piston mechanism 7 is triggered;

the upper end of the piston mechanism 7 is connected to the spray boom 41, and the lower end thereof is connected to a piston seat 11; the environment friendly plastic upper spring 6 is sleeved on the upper end of the piston mechanism 7; the hexagonal plug 5 is sleeved outside the environment friendly plastic upper spring; the upper end of the environmentally friendly plastic lower spring 8 is connected to the lower end of the piston seat 11; the hexagonal plug 5, the piston mechanism 7, the environmentally friendly plastic upper spring 6, and the environmentally friendly plastic lower spring 8 are all arranged in the cavity of the pump body 10; the plastic ball 9 is located between the environmentally friendly plastic lower spring 8 and the pump body 10.

A switch 14 is provided between the spray boom 41 and the positioning seat 3; the inner side of the switch 14 is symmetrically provided with sliding grooves 141 matched with the sliders 42; a toggle lever 142 is provided on one side of the switch 14. When in use, toggle the toggle lever 142 to move the sliding groove 141 in the switch 14 to just below the slider 42; at this time, the unlocking is completed and the nozzle mechanism 4 can move down, otherwise, it is in a locked state to prevent liquid leakage.

The rear part of the handle 1 is provided with shaft holes 101; the lower end of the shaft hole 101 is provided with a first inclined surface 103; the upper end of the guiding shaft 33 is provided with a second inclined surface 36; in assembling, the handle 1 passes through the first inclined surface 103 and the second inclined surface 36, and the guiding shaft 33 is pressed into the shaft hole 101, which greatly reduces assembly time.

The environmentally friendly plastic upper spring 6 is provided with elastic ribs 61; the elastic ribs 61 are axially inclined and arranged on the outer circumference of the environmentally friendly plastic upper spring 6. The elastic rib 61 has a good resetting effect. When there is pressure, the elastic rib 61 will be compressed along the inclined plane; when the pressure disappears, the elastic rib 61 can be reset.

At least two limiting ribs 143 are evenly arranged on the outer circumference of the switch 14; the middle of the convex part 34 is provided with a gap 35; the limiting ribs 143 and the gap 35 are matched and connected. The purpose of this structure is to be able to lock the position of the switch 14. In this embodiment, three limiting ribs 143 are used, which are respectively arranged on the opposite side and two sides of the toggle lever 142. The limiting ribs 143 are engaged with the convex part 34 to lock the position of the switch 14.

The environmentally friendly plastic lower spring 8 has a ring shape at the upper end, a hollow wave shape at the middle part, and a cylindrical part with a notch at the lower end; the environmentally friendly plastic lower spring 8 is integrally formed. When the environmentally friendly plastic lower spring 8 is compressed, the wavy middle part has good return characteristics, and the wavy hollow part does not affect the upward movement of the liquid.

The cylindrical part 81 of the environmentally friendly plastic lower spring 8 abuts against the inner end surface of the pump body 10.

The lower end of the pump body 10 is provided with a suction pipe 13, and the pump body 10 is also provided with a thread ring 12 for connecting with the external bottle body.

Working Principle:

Press down on the handle, the handle will drive the environmentally friendly reset plastic spring to be pressed down; at this time, the environmentally friendly reset plastic spring itself accumulates resilience, and the convex part of the connecting rod moves down as the environmentally friendly reset plastic spring presses down, thereby driving the piston rod to move down; the piston rod drives the piston seat and piston down; after the piston moves down to a predetermined position, the pressure in the bottle accumulates and the piston seat continues to move down; the ball floats up due to the pressure in the bottle, and the solution rises from the gap between the piston seat and the piston, and finally sprays out from the nozzle; at this time, both the environmentally friendly plastic upper spring and the environmentally friendly plastic lower spring are in a compressed state; when the handle is not pressed down, the environmentally friendly plastic upper spring and the environmentally friendly plastic lower spring reset the piston, the piston rod, the piston seat and other components to complete the use.

In summary, the above embodiments are not restrictive embodiments of the patent of the invention. All modifications or equivalent variations made by those skilled in the art on the basis of the essence of the patent of the invention shall all fall within the technical scope of the patent of the invention.

The invention claimed is:

1. An all-plastic spray device, comprising a handle (1), an environmentally friendly cross-arm plastic spring (2), a positioning seat (3), a nozzle mechanism (4), a hexagonal plug (5), a piston mechanism (7), an environmentally friendly plastic upper spring (6), an environmentally friendly plastic lower spring (8), a plastic ball (9), and a pump body (10); wherein:

a connecting rod part extends from one side of the positioning seat (3); inner side of the connecting rod part is provided with a guiding groove (32); side walls of the guiding groove (32) are provided with a convex part (34); a guiding shaft (33) is provided at both ends of the connecting rod part; a lower end of the cross-arm plastic spring is inserted into the guiding groove (32), and the cross-arm plastic spring can be pressed along an end of the convex part (34); a cross arm of the cross-arm plastic spring abuts against the inner side of the handle (1); the guiding shaft (33) is rotatably connected to the handle (1);

a lower end of the nozzle mechanism (4) is provided with a spray boom (41); sliders (42) at both sides of the spray boom (41); an upper end of each slider (42) is also provided with an arc-shaped rotating part (43); an arc-shaped groove (102) is provided on the handle (1) at a position corresponding to the arc-shaped rotating part (43);

an upper end of the piston mechanism (7) is connected to the spray boom (41), and a lower end of the piston mechanism is connected to a piston seat (11); the environment friendly plastic upper spring (6) is sleeved on the upper end of the piston mechanism (7); the hexagonal plug (5) is sleeved outside the environment friendly plastic upper spring; an upper end of the environmentally friendly plastic lower spring (8) is connected to the lower end of the piston seat (11); the hexagonal plug (5), the piston mechanism (7), the environmentally friendly plastic upper spring (6), and the environmentally friendly plastic lower spring (8) are all arranged in the cavity of the pump body (10); the plastic ball (9) is located between the environmentally friendly plastic lower spring (8) and the pump body (10).

2. The all-plastic spray device according to claim 1, wherein a switch (14) is provided between the spray boom (41) and the positioning seat (3); an inner side of the switch (14) is symmetrically provided with sliding grooves (141) matched with the sliders (42); a toggle lever (142) is provided on one side of the switch (14).

3. The all-plastic spray device according to claim 1, wherein a rear part of the handle (1) is provided with shaft holes (101); lower ends of the shaft holes (101) are provided with a first inclined surface (103); an upper end of the guiding shaft (33) is provided with a second inclined surface (36); in assembling, the handle (1) passes through the first inclined surface (103) and the second inclined surface (36), and the guiding shaft (33) is pressed into the shaft holes (101).

4. The all-plastic spray device according to claim 2, wherein the environmentally friendly plastic upper spring (6) is provided with elastic ribs; the elastic ribs are axially inclined and arranged on an outer circumference of the environmentally friendly plastic upper spring (6).

5. The all-plastic spray device according to claim 1, wherein at least two limiting ribs (143) are evenly arranged on an outer circumference of the switch (14); a middle of the convex part (34) is provided with a gap (35); the limiting ribs (143) and the gap (35) are matched and connected.

6. The all-plastic spray device according to claim 1, wherein the environmentally friendly plastic lower spring (8) has a ring shape at the upper end, a hollow wave shape at the middle part, and a cylindrical part with a notch at the lower end; the environmentally friendly plastic lower spring (8) is integrally formed.

7. The all-plastic spray device according to claim 1, wherein a cylindrical part of the environmentally friendly plastic lower spring (8) abuts against an inner end surface of the pump body (10).

8. The all-plastic spray device according to claim 1, wherein a lower end of the pump body (10) is provided with a suction pipe (13).

* * * * *